United States Patent
Dumais et al.

(10) Patent No.: US 7,162,473 B2
(45) Date of Patent: *Jan. 9, 2007

(54) METHOD AND SYSTEM FOR USAGE ANALYZER THAT DETERMINES USER ACCESSED SOURCES, INDEXES DATA SUBSETS, AND ASSOCIATED METADATA, PROCESSING IMPLICIT QUERIES BASED ON POTENTIAL INTEREST TO USERS

(75) Inventors: Susan T. Dumais, Kirkland, WA (US); Eric J. Horvitz, Kirkland, WA (US); Edward B. Cutrell, Seattle, WA (US); Jonathan J. Cadiz, Redmond, WA (US); Gavin Jancke, Sammamish, WA (US); Raman K. Sarin, Redmond, WA (US); Daniel C. Robbins, Seattle, WA (US); Anoop Gupta, Woodinville, WA (US); George G. Robertson, Seattle, WA (US); Meredith J. Ringel, Stanford, CA (US); Jeremy Goecks, Atlanta, GA (US)

(73) Assignee: Microsoft Corporation, Redmond, WA (US)

( * ) Notice: Subject to any disclaimer, the term of this patent is extended or adjusted under 35 U.S.C. 154(b) by 412 days.

This patent is subject to a terminal disclaimer.

(21) Appl. No.: 10/607,228

(22) Filed: Jun. 26, 2003

(65) Prior Publication Data
US 2004/0267700 A1 Dec. 30, 2004

(51) Int. Cl.
*G06F 17/30* (2006.01)
*G06F 17/00* (2006.01)
(52) U.S. Cl. ............. 707/5; 707/3; 707/10; 707/102; 715/811; 715/963; 715/968
(58) Field of Classification Search ............... 707/1–5, 707/10, 100–104.1, 200; 715/811–819, 854, 715/963, 968; 709/220–226
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,778,378 A | 7/1998 | Rubin | |
| 5,812,865 A | 9/1998 | Theimer et al. | |
| 6,230,172 B1* | 5/2001 | Purnaveja et al. | 715/512 |
| 6,271,840 B1* | 8/2001 | Finseth et al. | 715/513 |
| 6,272,507 B1* | 8/2001 | Pirolli et al. | 715/513 |
| 6,278,992 B1* | 8/2001 | Curtis et al. | 707/3 |
| 6,278,993 B1 | 8/2001 | Kumar et al. | |
| 6,321,228 B1 | 11/2001 | Crandall et al. | |
| 6,446,035 B1* | 9/2002 | Grefenstette et al. | 704/1 |
| 6,466,232 B1 | 10/2002 | Newell et al. | |
| 6,493,718 B1 | 12/2002 | Petculescu et al. | |
| 6,513,046 B1 | 1/2003 | Abbott, III et al. | |
| 6,546,388 B1 | 4/2003 | Edlund et al. | |
| 6,549,915 B1 | 4/2003 | Abbott, III et al. | |
| 6,557,042 B1* | 4/2003 | He et al. | 709/231 |
| 6,605,120 B1 | 8/2003 | Fields et al. | |
| 6,615,258 B1* | 9/2003 | Barry et al. | 709/223 |
| 6,691,106 B1* | 2/2004 | Sathyanarayan | 707/3 |
| 6,745,178 B1 | 6/2004 | Emens et al. | |
| 6,747,675 B1 | 6/2004 | Abbott et al. | |
| 6,789,115 B1* | 9/2004 | Singer et al. | 709/224 |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,819,339 B1 | 11/2004 | Dowling | |
| 6,842,877 B1 | 1/2005 | Robarts et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0010679 A1* | 1/2002 | Felsher | 705/51 |

| | | | |
|---|---|---|---|
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2003/0014399 A1* | 1/2003 | Hansen et al. | 707/3 |
| 2003/0028631 A1* | 2/2003 | Rhodes | 709/224 |
| 2003/0046401 A1 | 3/2003 | Abbott et al. | |
| 2003/0055827 A1 | 3/2003 | Keohane et al. | |
| 2003/0061209 A1* | 3/2003 | Raboczi et al. | 707/3 |
| 2003/0135612 A1* | 7/2003 | Huntington et al. | 709/224 |
| 2003/0154476 A1 | 8/2003 | Abbott, III et al. | |
| 2003/0177111 A1* | 9/2003 | Egendorf et al. | 707/3 |
| 2003/0182310 A1* | 9/2003 | Charnock et al. | 707/104.1 |
| 2003/0227487 A1* | 12/2003 | Hugh | 345/777 |
| 2004/0001104 A1* | 1/2004 | Sommerer et al. | 345/811 |
| 2004/0215608 A1 | 10/2004 | Gourlay | |
| 2004/0260620 A1* | 12/2004 | Dunn et al. | 705/26 |
| 2004/0267730 A1* | 12/2004 | Dumais et al. | 707/3 |
| 2005/0021485 A1* | 1/2005 | Nodelman et al. | 706/21 |
| 2005/0034078 A1 | 2/2005 | Abbott et al. | |
| 2006/0048060 A1* | 3/2006 | Mohr et al. | 715/747 |
| 2006/0100856 A1* | 5/2006 | Kang et al. | 704/9 |

FOREIGN PATENT DOCUMENTS

| | | | |
|---|---|---|---|
| CA | 2364920 | * | 6/2002 |
| EP | 0497479 A1 | * | 1/1991 |
| EP | 1282270 | * | 2/2003 |
| EP | 1677217 | * | 7/2006 |
| WO | WO 98/32289 | * | 7/1998 |
| WO | WO 2004/088510 | * | 10/2004 |

OTHER PUBLICATIONS

Biswajit Samanta et al. "Sparse data division using data segmentation and Kohonen network for neural network and geostatistical ore grade modeling in nome offshore placer deposit", natural resources research vol. 13, No. 3, Sep. 2004, pp. 189-200.*

Lucio Soibelman et al. "data preparation process for construction knowledge generation through knowledge discovery in databases", Journal of computing in civil engineering, Jan. 2002, pp. 39-48.*

Etzard Stolte et al. "streamCorder: fast trial-and-error analysis in scientific databases", proceedings of the 18th international conference on data engineering, 2002 IEEE, computer society, 2 pages.*

Goebel,S, webvizard: intelligent system for geodata visualization and CBT in the WWW, proceddings, computer graphics internation, 1998, pp. 113-122.*

Hinds,N et al. "managing metadata for distributed information servers", proceedings of the thirty first Hawai conference on system sciences, 1998, vol. 4, pp. 513-522.*

Zheng Chen et al. "a unified framework for web link analysis", WISE 2002 proceedings third international conference on web information systems engineering, pp. 63-70.*

Paliouras,G et al. "from the web usage statistics to wseb usage analysis", IEEE international conference on systems, Man, and cybernetics, 1999, vol. 2, pp. 159-164.*

E. Adar, et al. Haystack: Per-user Information Environments. In Proc. of CIKM '99, pp. 413-422, 1999.

J. Anderson, et al. Reflections of the Environment in Memory. Psychological Science, vol. 10, pp. 396-408, 1991.

D. Barreau and B. Nardi. Finding and Remembering: File Organization from the Desktop. SIGCHI Bulletin, vol. 27 No. 3, 1995. 5 pages.

V. Bellotti and I. Smith. Informing the Design of an Information Management System with Iterative Fieldwork. Proc. of DIS '00, pp. 227-237, 2000.

A. Broder, et al. Graph Structure in the Web. In Proc. of the 9th International WWW Conference, pp. 309-320, 2000.

Q. Burrell. A Simple Stochastic Model for Library Loans. Journal of Documentation, vol. 36 No. 2, pp. 115-132, 1980.

V. Bush. As We May Think. Atlantic Monthly, vol. 176, pp. 101-108, 1945.

V. Bush. Science is Not Enough. Chapter: Memex Revisited, pp. 75-101. New York: William Morrow.

L. Catledge and J. Pitkow. Characterizing Browsing Strategies in the World Wide Web. In Proc. of the 3rd International WWW Conference, 1995. 10 pages.

A. Cockburn and S. Greenberg. Issues of Page Representation and Organization in Web Broswers Revisitation Tools. In Proc. of OzCHI '99, pp. 7-14, 1999.

P. Dourish, et al. Presto: An Experimental Architecture for Fluid Interactive Document Spaces. ACM Transactions on Computer-Human Interaction, vol. 6 No. 2, pp. 133-161, 1999.

T. Erickson. The Design and Long-term use of a Personal Electronic Notebook: A Reflective Analysis. Proc. of the ACM CHI 96 Conference on Human Factors in Computing Systems, pp. 11-18, 1996.

S. Fertig, et al. Lifestreams: An Alternative to the Desktop Metaphor. In Proc. of ACM CHI 96 Conference on Human Factors in Computing, pp. 410-411, 1996.

S. Greenberg. The Computer User as a Toolsmith: The use, reuse, and organization of computer-based tools. Cambridge, MA: Cambridge University Press. 198 pages.

D. Hynh, et al. Haystack: A Platform for Creating, Organizing, and Visualizing Information using RDF. Semantic Web Workshop 2002. 10 pages.

W. Jones, et al. Keeping Found Things Found on the Web. In Proc. of CIKM 2001, pp. 119-126, 2001.

W. Jones, et al. Once Found What Next? A Study of "Keeping" Behaviors in the Personal Use of Web Information. ASIST 2002. 12 pages.

S. Jones and P. Thomas. Empirical Assessment of Individuals' Personal Information Management Systems. Behaviour and Information Technology, vol. 16 No. 3, pp. 158-160, 1997.

S. Kaasten and S. Greenberg. Integrating Back, History, and Bookmarks in Web Browsers. In Proc. of ACM Conference on Human Factors in Computing Systems, pp. 379-380, 2001.

S. Kaasten, et al. How People Recognize Previously Seen WWW Pages from Titles, URLs, and Thumbnails. In Proc. of Human Computer Interaction 2002, pp. 247-265.

T. Malone. How do People Organize their Desks? Implications for the Design of Office Information Systems. ACM Transactions on Office Information Systems, vol. 1 No. 1, pp. 99-112, 1983.

H Marais and K. Bharat. Supporting Cooperative and Personal Surfing with a Desktop Assistant. Proceedings of UIST 1997, pp. 129-138.

B. McKenzie and A. Cockburn. An Empirical Analysis of Web Page Revisitation. In Proc. of the 34th International Conference on System Science, 2001. 9 pages.

B. Nardi, et al. Integrating Communication and Information through ContactMap. Communications of the ACM, vol. 45, pp. 89-95, 2002.

J. Pitkow and P. Pirolli. Life, Death, and Lawfulness on the Electronic Frontier. In Proc. of ACM CHI 97 Conference on Human Factors in Computing Systems, pp. 383-390, 1997.

M. Recker and J. Pitkow. Predicting Document Access in Large, Multimedia Repositories. Georgia Tech, Tech Report, Aug. 23, 1994. 24 pages.

C. Silverstein, et al. Analysis of a Very Large Alta Vista Query Log. SRC Technical Note 1998-014, Oct. 26, 1998. 18 pages.

A. Spink, et al. Searching the Web: The Public and their Queries. Journal of the American Society for Information Science, vol. 53 No. 2, pp. 226-234, 2001.

L. Tauscher and S. Greenberg. How People Revisit Web Pages: Empirical Findings and Implications for the Design of history Systems. International Journal of Human Computer Studies, Special Issue on WWW Usability. vol. 47 No. 1. pp. 97-138.

S. Whitaker and C. Sidner. Email Overload: Exploring Personal Information Management of Email. Proceedings of ACM CHI 96 Conference on Human Factors in Computing Systems, pp. 276-283, 1996.

Dieter Fensel, et al., Oil: An Ontology Infrastructure for the Semantic Web, The Semantic Web, Mar./Apr. 2001, pp. 38-45.

Lipyeow Lim, et al., Dynamic Maintenance of Web Indexes Using Landmarks, Proceedings of the Twelfth Internaitonal Conference on World Wide Web, May 20-24, 2003, pp. 102-111, Budapest, Hungary.

Tetsuya Sakai, et al., Generic Summaries for Indexing in Information Retrieval-Detailed Test Results, Proceedings of the 24th Annual International ACM SIGIR Conference, pp. 190-198, 2001.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2002, 16 pages.

William Noah Schilt, A System Architecture for Context-Aware Mobile Computing, Columbia University, 1995, 153 pages.

Mike Speitzer, et al., Providing Location Information in a Ubiquitous Computing Environment, SIGOPS '93, 1993, pp.270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38-No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36- No. 7.

Roy Want, et al., The Active Badge Location System, ACM Transactions on Information Systems, Jan. 1992, pp. 91-102, vol. 10 - No. 1.

Mark Weiser, Some Computer Science Issues in Ubiquitous Computing, Communications of the ACM, Jul. 1993, pp. 75-84, vol. 36 - No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8 - No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, pp. 94-104, vol. 265 - No. 3.

\* cited by examiner

*Primary Examiner*—Srirama Channavajjala
(74) *Attorney, Agent, or Firm*—Amin, Turocy, & Calvin, LLP

(57) ABSTRACT

The present invention relates to systems and methods providing content-access-based information retrieval. Information items from a plurality of disparate information sources that have been previously accessed or considered are automatically indexed in a data store, whereby a multifaceted user interface is provided to efficiently retrieve the items in a cognitively relevant manner. Various display output arrangements are possible for the retrieved information items including timeline visualizations and multidimensional grid visualizations. Input options include explicit, implicit, and standing queries for retrieving data along with explicit and implicit tagging of items for ease of recall and retrieval. In one aspect, an automated system is provided that facilitates concurrent searching across a plurality of information sources. A usage analyzer determines user accessed items and a content analyzer stores subsets of data corresponding to the items, wherein at least two of the items are associated with disparate information sources, respectively. An automated indexing component indexes the data subsets according to past data access patterns as determined by the usage analyzer. A search component responds to a search query, initiates a search across the indexed data, and outputs links to locations of a subset and/or provides sparse representations of the subset.

26 Claims, 9 Drawing Sheets

METHOD AND SYSTEM FOR USAGE ANALYZER THAT DETERMINES USER ACCESSED SOURCES, INDEXES DATA SUBSETS, AND ASSOCIATED METADATA, PROCESSING IMPLICIT QUERIES BASED ON POTENTIAL INTEREST TO USERS

TECHNICAL FIELD

The present invention relates generally to computer systems, and more particularly, to systems and methods that facilitate information retrieval of data that has been previously accessed or considered, wherein the retrieved data is provided to a user in a cognitively relevant manner.

BACKGROUND OF THE INVENTION

Psychologists have confirmed commonplace intuitions about the significant limitations that people have with remembering items and events. These limitations become apparent when people attempt to retrieve information such as during a search for previously seen information using common search tools such as a web browser.

Most information retrieval tools, like popular web or intranet search engines, are designed to facilitate information discovery. However, much knowledge work involves integration and reuse of information that has previously been created, found or received. For example, creating a presentation or paper may involve pulling together information from existing information sources like presentations, documents, spreadsheets, data analyses, email messages, and so forth. Studies have shown that a large percentage of web pages accessed were re-visits to pages previously seen. Similar re-access patterns have been observed in retrieving information from technical manuals, Unix commands, book borrowing, and human memory, for example.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention facilitates information reuse by enabling users to find or retrieve previously contemplated information in a substantially efficient manner. Various components such as an automated indexing tool and user interface provide functionality for automatically indexing previously accessed or considered information and presenting the information to a user in a cognitively relevant manner. In one aspect, the present invention provides a unified index of information that a person has observed, whether it be email, web pages, office documents, calendar appointments, and so forth. Currently, users have to manage several different organizations of information (e.g., a file system hierarchy for files, email folders for email, favorites or history for web pages). The present invention integrates these disparate information sources into a single index that can be queried for information retrieval—regardless of what form the information originated in. Indexing happens automatically without need for intervention by the user. Ongoing user activity (e.g., creating documents, reading email or viewing web pages) triggers the indexing, without any additional work by the user. The user interface facilitates information searches that automatically cut across different information sources while supporting fast information retrieval, filtering and sorting due to the indexing process. In another aspect, since the retrieved information is familiar to the user, rich contextual cues such as date, author, thumbnails and previews are provided with retrieved items that are especially helpful in quickly recognizing items.

Various processes can be applied to determine when an information item has been accessed or previously contemplated before automated indexing of the item occurs. In one aspect, files can be examined for such information as date opened or created, last accessed, and/or other indicia indicating if the information item has already been observed. In other cases, more subtle processes can be applied.

In yet other aspects of the present invention, an automated event architecture can be provided that monitors user activities and records events relating to when information has been accessed or seen by the user (e.g., monitor desktop mouse and keyboard activities and record index event when user selects or contemplates an information item).

In another aspect of the present invention, a concept known as "useful date or time" can be applied to display the cognitively useful date for different resources. Different dates are useful for different content sources, so an abstract "useful date" can be created for integrated presentation. For example, merely recording when a calendar appointment has been created may not be entirely useful when reminding the user of the actual appointment and information associated therewith. Thus, in this example, if retrieving information relating to a past meeting, it would be more cognitively relevant to indicate or provide the actual time of the meeting than to provide indications of when the meeting was calendared since most users do not have any cognitive links relating to meeting creation. For Web pages, on the other hand, the date they were last read is useful for retrieval purposes. The "useful date" abstraction allows these different dates to be combined successfully in the interface.

The present invention can be componentized into a set of modules that communicate among one another through well-defined programming interfaces, so that basic infrastructural modules that perform indexing and retrieval can communicate with different kinds of user interfaces and services. The user interface innovations of the present invention provide rich environments for querying indexed information and displaying the information in a plurality of relevant contexts and with a variety of display metaphors. Displays can include timeline visualizations, wherein retrieved items are arranged and displayed according to time along with memorable or landmark events of the user (e.g., holiday, birthday, 9/11, and so forth). Other visualizations include grid visualizations that employ a two-dimensional grid to generalize answers to queries beyond individual results and summarize search results by people, topics, and time. Although information can be indexed based upon past observances of the user, the present invention can also provide information regarding items the user may want to see in the future (e.g., search for messages that are relevant to a particular context (e.g., retrieve messages sent by those attending past meeting who are invited to upcoming meeting—in addition, provide messages related to past meeting)).

Still yet other aspects of the user interface include various input and query options for efficiently locating information. This can include explicit queries, implicit queries, context-sensitive queries, considerations of application context, and item-centric integrations when displaying, retrieving, and/or manipulating items. Other interface options enable users to tag information items as part of metadata associated with the items (e.g., My Favorite Website tagged as metadata to a hyperlink for sports). Tagging can also include implicit or automated tagging of an item (e.g., user looked at an item 20 times during past month, therefore, tag item with exclamation indicating high importance). As can be appreciated, the automated indexer and user interface can be provided on a client machine such as a desktop application, administered from a centralized server, and/or executed as combinations thereof.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIG. 3 is an example user interface illustrating an example enhanced list-view interface in accordance with an aspect of the present invention.

FIG. 4 is an example user interface illustrating an example grid-view interface in accordance with an aspect of the present invention.

DETAILED DESCRIPTION OF THE INVENTION

Figure 1:
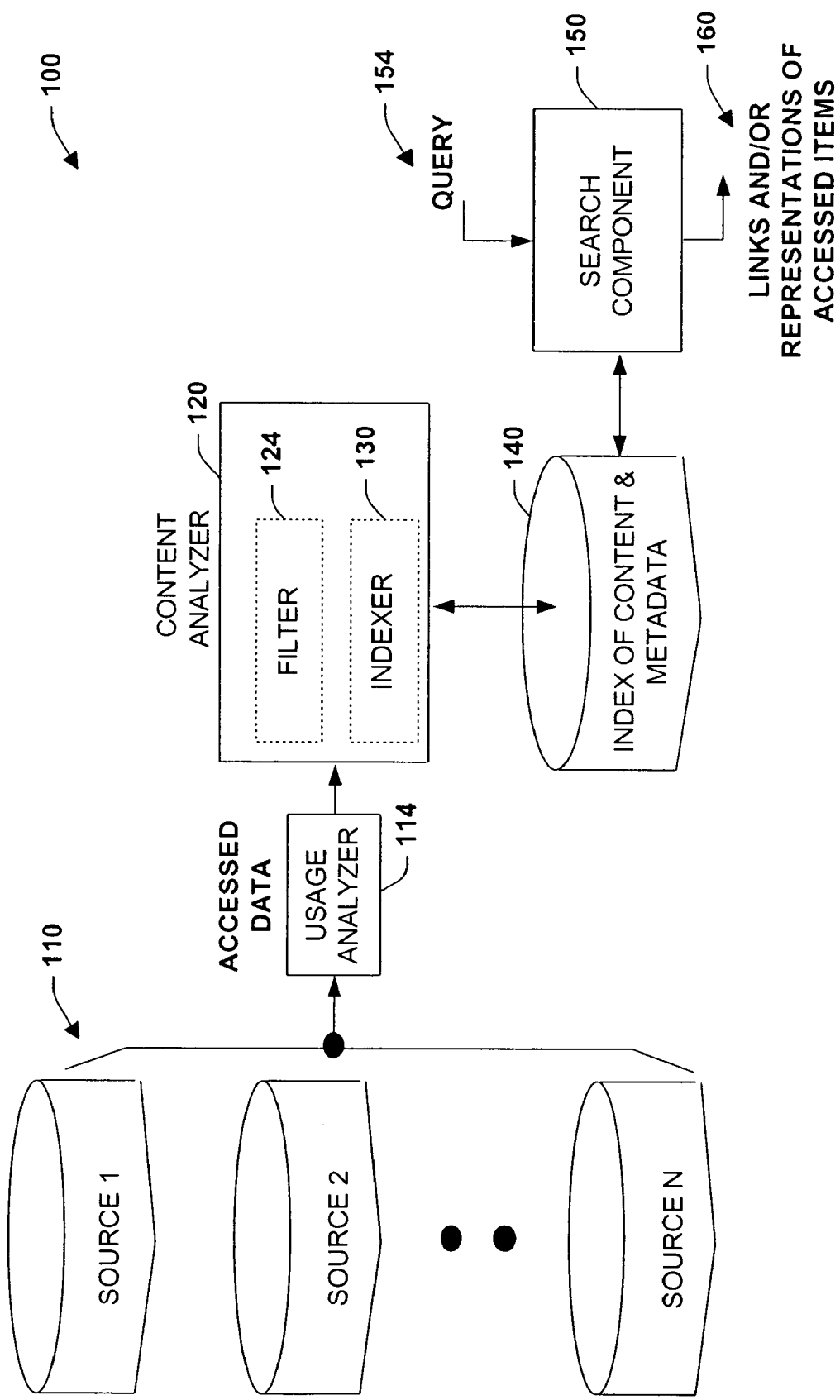
FIG. 1 is a schematic block diagram illustrating access-based information retrieval system in accordance with an aspect of the present invention.

The present invention relates to systems and methods providing access-based information retrieval. Information items from a plurality of disparate information sources that have been previously accessed or considered are automatically indexed in a data store, whereby a multifaceted user interface is provided to efficiently retrieve the items in a cognitively relevant manner. Various display output arrangements are possible for the retrieved information items including enhanced list views, timeline visualizations and multidimensional grid visualizations. Input options include explicit and implicit queries for retrieving data along with explicit and implicit tagging of items for ease of recall and retrieval. In one aspect, an automated system is provided that facilitates concurrent searching across a plurality of information sources. A usage analyzer determines if, when, and, in some cases, how a user accessed items and stores subsets of data corresponding to the items, including the time, and access method, wherein at least two of the items may be associated with disparate information sources, respectively. An automated indexing component indexes the data subsets according to past data access patterns as determined by the usage analyzer. A search component responds to a search query, initiates a search across the indexed data, and outputs links to locations of a subset and/or provides sparse representations of the subset.

As used in this application, the terms "component," "analyzer," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context, action or event, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to FIG. 1, a system 100 illustrates access-based information retrieval in accordance with an aspect of the present invention. The system 100 includes one or more information sources 110 that are accessed or considered by a user. These sources 110 can be similar or disparate in nature having dissimilar information content, whereby some of the information sources may represent local data locations such as files, folders, applications, images, audio files, appointments, email, and so forth, and other sources 110 may represent remote sources such as web information, for example. As the user accesses different types of information over time, a usage analyzer 114 determine what to index and passes this information to a content analyzer 120 which can operate as a background task locally on a client machine and/or remotely in accordance with a server, processes the accessed data via a filter 124 for parsing content from data, and an automated indexer 130 that creates a content index 140 of accessed data items.

In general, the analyzer 120 creates sparse representations of accessed data in the content index 140. For example, if the user has accessed a web page, the content analyzer 120 may create a thumbnail representation of the web page and associate a hyperlink reference to the page and thumbnail as part of a metadata file. In another case, if the user then accessed a text document having images contained therein, the analyzer 120 may extract the text or portions thereof, and associate a database link such as a file path as part of metadata. The indexer 130 would then automatically create an index (or add to an existing index) having two items in the content index 140—the thumbnail representation and text document representation including metadata. In general, filters analyze the content of and metadata associated with items. So, for a Word document, for example, the filter 124 extracts metadata such as filename, title, author, keywords, creation date, etc. along with the words in the document. This is what is used to build the index 140. The creation of thumbnails and the analysis of images could also be encapsulated in the filter 124, if desired.

As will be described in more detail below, the metadata may contain other items such as user-created and/or implicit tags that describe the items stored in the content index 140. It is to be appreciated that the indexer 130 may also perform filter 124 functions (e.g., indexer associates metadata with filtered content).

A search component 150 is provided that receives a user query 154 for information items contained in the content index 140. The search component 150 can be provided as part of a user interface (described below) returns links and/or representations of accessed items at 160 to the user in response to the query 154. For example, the user may query for "items relating to last years performance review," wherein the search component 150 extracts items from the content index 140 such as emails, coworker evaluations, documents published in the last year, web page images, audio recordings and so forth relating to the context of the query 154. In another example, an implicit query may be derived from the query 154 (e.g., whenever I get a phone call from this person, pull-up last five e-mails from this person).

As will be described in more detail below, accessed items can be presented in a plurality of differing formats designed to facilitate efficient and timely retrieval of information items that have been previously accessed. Also, the links and/or representations 160 may include other items of interest to the user such as providing information items that the user may want to see other than those items previously accessed (e.g., system provides links to other content of interest based upon or inferred from query at hand, e.g., in addition to showing performance review items, optionally provide links to human resources describing review policies based on another index of content even though these items may or may not have not been previously accessed by the user).

One approach to combining methods for indexing and retrieval of information from a personal store is to also send a submitted query (or an automatically reformulated version of that query) to another search engine in addition to the personal search system, e.g., MSN Search or Google for the accessing resources from the World Wide Web, and to integrate the results from the personal search engine with the other search results in the displayed result list. Gathering results from the personal store and from the outside resources (e.g., the Internet) provide opportunities for display of the two lists of results in different ways. For example, a system can mark the search results as coming from outside the personal store, or from the particular store it has been retrieved from (e.g., from "the Web" or from "cs.stanford.edu on the Web"). The results can be interleaved with the personal results or returned in a separately marked region of the display (e.g., listed separately in a separate display region, labeled, "From the Web.") By unifying the personal information indexing and retrieval system with other, potentially broader search methods and resources, a personal browsing system can be positioned as a general information portal to all of a user's content and key external resources. The user can use the portal to search on personal information, as well as more general resources, and to decide with the control of parameters, at set up time or in stream with a query, to search across personal, outside resources, or combinations thereof.

The system 100 provides many features not found in conventional search tools. The present invention mitigates the problem of search across heterogeneous information types by providing a unified index of all the information a person has seen (or subset thereof), regardless of whether the information was observed as email, web pages, documents, calendar appointments, and so forth. If a user wants to restrict searches to a particular data source they can, but this is not a prerequisite. Indexing is performed automatically by the analyzer 120 without need for user interaction. Since retrieved information is personal and has been seen before, rich contextual cues can be provided such as time, author, thumbnails and previews to facilitate data retrieval. Moreover, the indexer 130 allows for very fast searching. This enables interesting interactions for filtering, sorting and browsing of the search results.

In one aspect of the present invention, an event component can be provided (not shown) (e.g., background task that monitors user activities associated with usage analyzer 114). The event component monitors user activities such as saving, reading, editing, copying, hovering on information, selecting information, manipulating information and/or deleting files, for example, and makes determinations with respect to user actions. This can include sensors such as microphones, cameras, and other devices along with monitoring desktop activities to determine user actions or goals. In one example, probabilistic models and/or logical decisions can be applied to determine events such as when a user has observed or contemplated information. Logical and/or statistical models (e.g., Bayesian inference models, decision trees, Support Vector Machines) can be constructed that consider the following example classes of evidence associated with patterns of user activity:

Focus of attention: Selection and/or dwelling on items, dwelling on portions of a document or on specific subtext after scrolling through a document.

Introspection: A pause after a period of activity or a significant slowing of the rate of interaction.

Undesired information: Immediate closure of a document after a brief glance, attempts to return to a prior state after an information access action. These observations include undoing the effect of recent action, including issuing an undo command, and deleting items.

Domain-specific syntactic and semantic content: Consideration of special distinctions in content or structure of documents and how user interacts with these features or items. These include domain-specific features associated with the task.

As can be appreciated, the present invention can employ the event component to trigger indexing of various types of information on the basis of user-activity. User's activity with information objects can also be utilized to improve information presentation.

Figure 2:
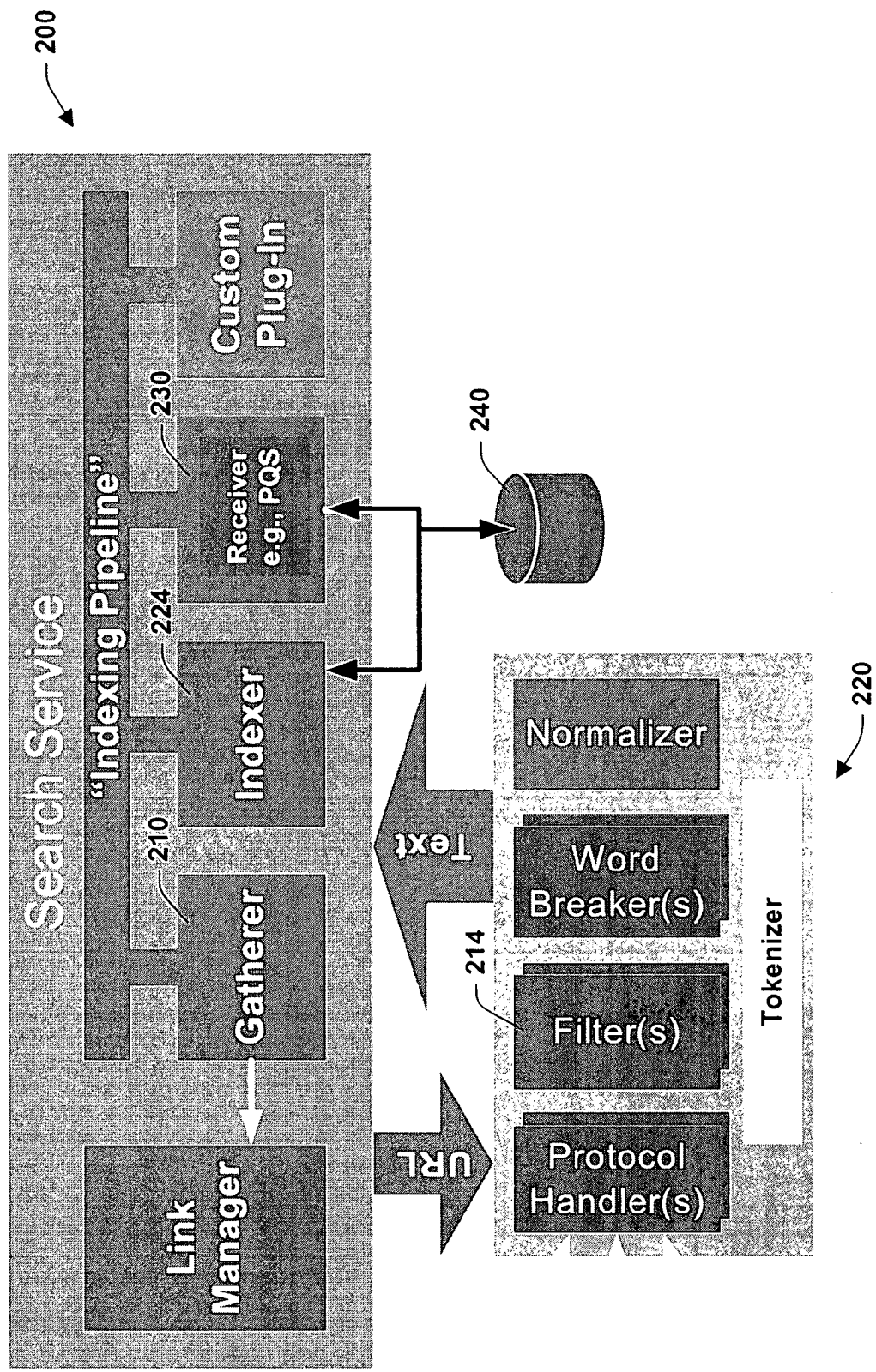
FIG. 2 is a schematic block diagram illustrating an exemplary access-based information retrieval system in accordance with an aspect of the present invention.

Referring now to FIG. 2, a system 200 illustrates an exemplary access-based information retrieval system in accordance with an aspect of the present invention. The components illustrated in the system 200 are exemplary in nature, and represent one possible implementation of the subject invention. It is to be appreciated other implementations are possible (e.g., one or more of the components may be combined with other components and/or may not be necessary to perform one or more aspects of the present invention). The system 200 can be constructed on top of a modular indexing architecture. There typically are five main components—a Gatherer 210, a Filter 214, a Tokenizer 220, an Indexer 224, and a Retriever 230. The Gatherer 210 specifies the interface to different content sources in their native format. Files, http, and MAPI are examples of gatherers 210 that are supported. The Filter 214 decodes individual file formats (e.g., .doc, .pdf, .ps, html) and emits a character stream for further processing.

The Tokenizer 220 breaks the stream of characters into 'words' and can also handle additional linguistic processing such as date normalization, stemming, and so forth. The Gatherer 210, Filter 214 and Tokenizer 220 components are extensible to handle new data sources, file types and languages. The Indexer 224 builds a standard index structure to support quick retrieval. The Retriever 230 is the query language for accessing stored information. It supports Boolean as well as best match retrieval on full text and metadata properties and allows phrase, wildcard and proximity searches, for example. These components typically run on a client machine but can also be distributed to a server environment as is described in more detail below. By default, the users' mail profile (both local and network stores), web cache, and personal files are indexed although other sources may be indexed as well. No additional work is required on the part of the user. As new mail is received, web pages viewed or information content created or modified, an index is automatically updated in a database 240 by the indexer 224.

In some cases, a custom MAPI protocol handler can be added to the system 200 to extract individual messages from exchange mail stores, local mail ost and pst files, and public folders. Algorithms can be provided for indexing attachments to email, which generalizes to other container objects such as tar files, for example. Other processes can be provided for indexing pages in a web cache and pointing to a local cached copy and/or a live website. Other algorithms can be adapted for quickly detecting items that have changed in mail stores for efficient index updating.

Figure 3:
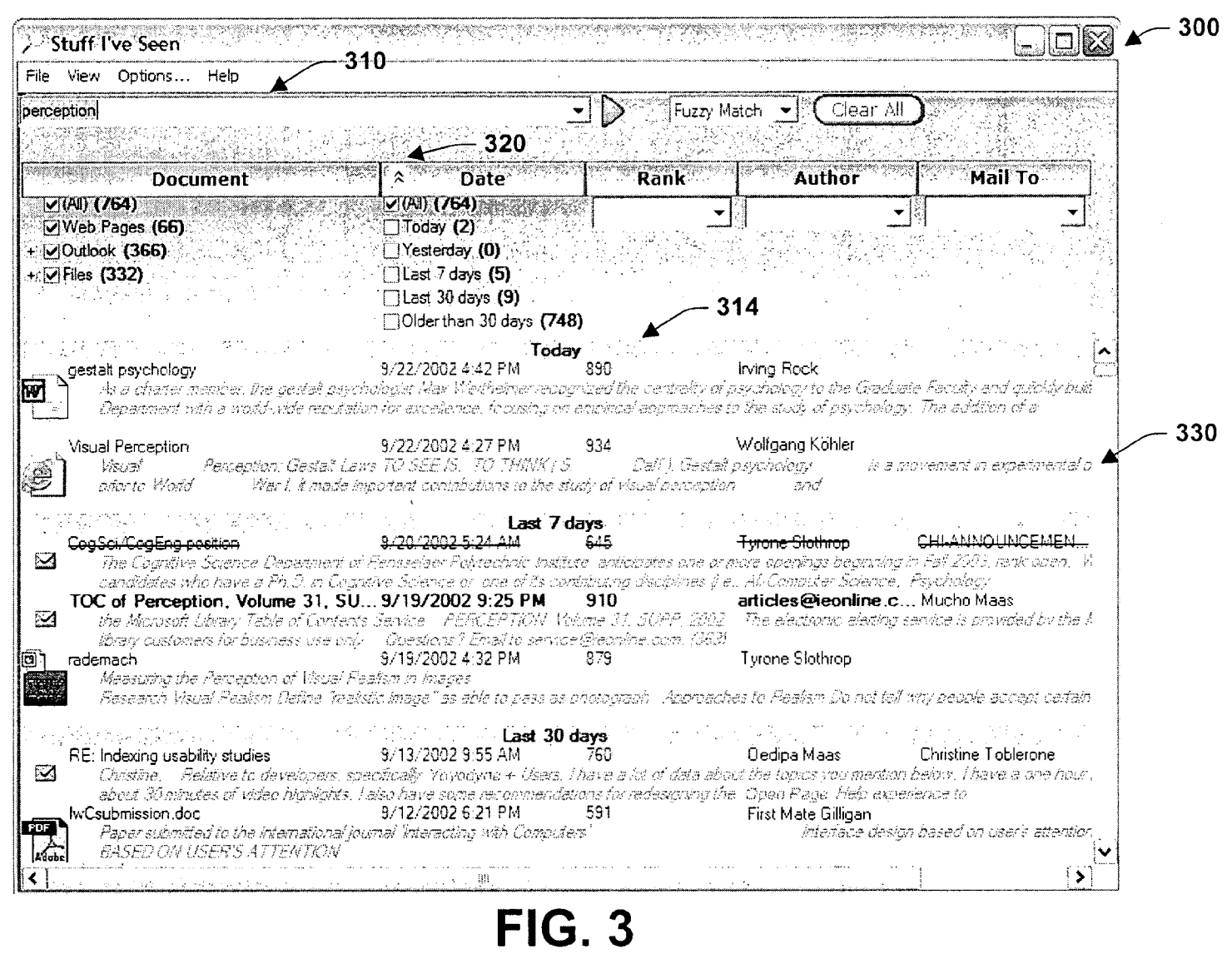

FIG. 3 is an example user interface 300 illustrating an example enhanced list-view interface in accordance with an aspect of the present invention. Before proceeding with a discussion of the interface 300, it is noted that the present invention can be associated with a Graphical User Interface (GUI), wherein the GUI provides a display having one or more display objects including such aspects as configurable icons, buttons, sliders, input boxes, selection options, menus, tabs and so forth having multiple configurable dimensions, shapes, colors, text, data and sounds to facilitate operations with the various components of the present invention. In addition, the GUI can also include a plurality of other inputs or controls for adjusting and configuring one or more aspects of the present invention and as will be described in more detail below. This can include receiving user commands from a mouse, keyboard, speech input, web site, remote web service, pattern recognizer, face recognizer, and/or other device such as a camera or video input to affect or modify operations of the GUI.

The user interface 300 allows users to specify queries and to view and manipulate results. As with other popular query interfaces, a carriage return launches the query. But, contrary to many query interfaces, the interface 300 also launches its queries when any of the filtering objects in the UI are manipulated. Since the present invention uses a local index of content (can be remote as well), query results can be returned very quickly, allowing users to search their content using a different interaction strategy than is used in other search interfaces.

A query text box 310 is in the upper left hand corner. By default, query words are combined using an AND operator. Users can specify other Boolean operators, a fuzzy matching alternative in which morphological variants are also used (e.g., car matches cars as well), or fielded search in which matches are restricted to certain fields (e.g., author="Jane Doe"). Details of search results are shown in the lower portion of the display at 314. Results include a preview showing the first 300 characters of a message (can be other amounts in preview) as well as thumbnails for images and PowerPoint files. The previews can be turned off, increasing the number of results displayed. Generally, five fields are present in a default view: Document Title, Date, Rank, Author and MailTo. It is to be appreciated that additional fields are also possible. Additional fields can include: File Type, Mail CC, Mail Has Attachment, Message Type, Message Read, Path, Size, Title. The results 314 are sorted by Date or Rank by default (different versions can be deployed having any suitable field, date is useful for personal data). Clicking on column headers sorts the results by that column. A double arrow 320 is shown in the column by which results are currently sorted (e.g., Date).

When Date is the sort field, markers showing the main date groupings (today, yesterday, etc.) are displayed to help group the results visually. A scroll bar 330 on the right allows users to quickly move through the results 314. Results lists can be further refined by selecting filters. In the enhanced list-interface, filters for columns are located at the top of the columns just below a column header. Checkboxes are shown when there are only a few alternatives (e.g., Document Type and Date), and text boxes with drop down lists are used when there are many possible alternatives (e.g., author). Filters can be applied even when there is no explicit textual query. Users can click the filters to return items from a certain date range, or items from a specific person.

As noted above, the interface 300 allows users to specify queries and to view and manipulate results. The results are typically shown in a list, although a rich set of alternative views on the same data are possible (See timeline and grid visualization below). By default date or a match score can be used to rank the items; but, results can be sorted in any way the user wants by clicking that column. Previews consisting of thumbnails and the first 300 characters (or other amount) of text are available and can be shown. Double clicking an item opens it in its native application. Right clicking brings up a context menu that allows users to go to the folder containing the item for mail or files and to a cached page for Web content, for example. In addition, items can be dragged from the results list to other applications or folders such as the file explorer, recycle bin or email.

In addition to indexing the full content and metadata of items, custom metadata can be added to items (i.e., user tagging). Arbitrary tags can be added by a user to substantially any item. These custom tags are then treated as a metadata attribute and can be used in a similar manner as other metadata properties for searching and results organization. Currently, these tags are used to supplement existing organizational schemes (e.g., mail or file hierarchy), but can also provide a single organizational schema for content. It is also possible to add usage-based metadata (e.g., from the usage component) to the index. Usage-based metadata can include events such as the last time a user accessed, or printed or mailed the content to others, or the complete history of interaction. Richer notions of interaction with documents (or portions of documents) are also possible. Usage data can be used to improve the presentation of results or to modify matching algorithms.

The subject invention can also be extended to index distributed content in other ways. It is straightforward to point the indexer to content on remote machines or shares. Another way to extend is to allow access to all content regardless of what machine the content was seen on originally (e.g., desktop, laptop, home). This can be achieved using a single index or remote access to and merging of multiple indices as is described in more detail below. Efficient handling of duplicates and near-duplicates is generally important in this case. A related aspect is to extend the present invention to "Stuff I Should See," considering, for example, information about the items that have been accessed by multiple people in an organization, shared via the merging of multiple indices or via the indexing of coalesced content. Such an application may employ privacy mechanisms such as filters and controls thereof for restricting the sharing of classes of information or activity, and anonymizing items in various ways, to remove personal information or associations.

Beyond making explicit searches, the present invention includes methods and user-interface tools that allow users to define "virtual folders" that contain the results of predefined, or persistent queries, including queries that have, as part of their definition, temporal or organizational relationships. For example, the queries can be, "Email from anyone above me in the organizational chart over the last seven days," or "Email flagged as high priority from JJ today," or "new documents on a project server." etc. These folders can be designed to appear as standard "folders" in the graphical user interfaces of file systems of computers. Also, folders can be nested within folders as sets and hierarchies. In one approach, a hierarchy of nested sets of folders of increasing specialization can be invoked to represent the results of queries with increasingly specialization. For example a high-level folder of email from my manager within the last week, may contain a folder of results of the query, "email from my manager directly to me within the last week," and so on.

Figure 4:
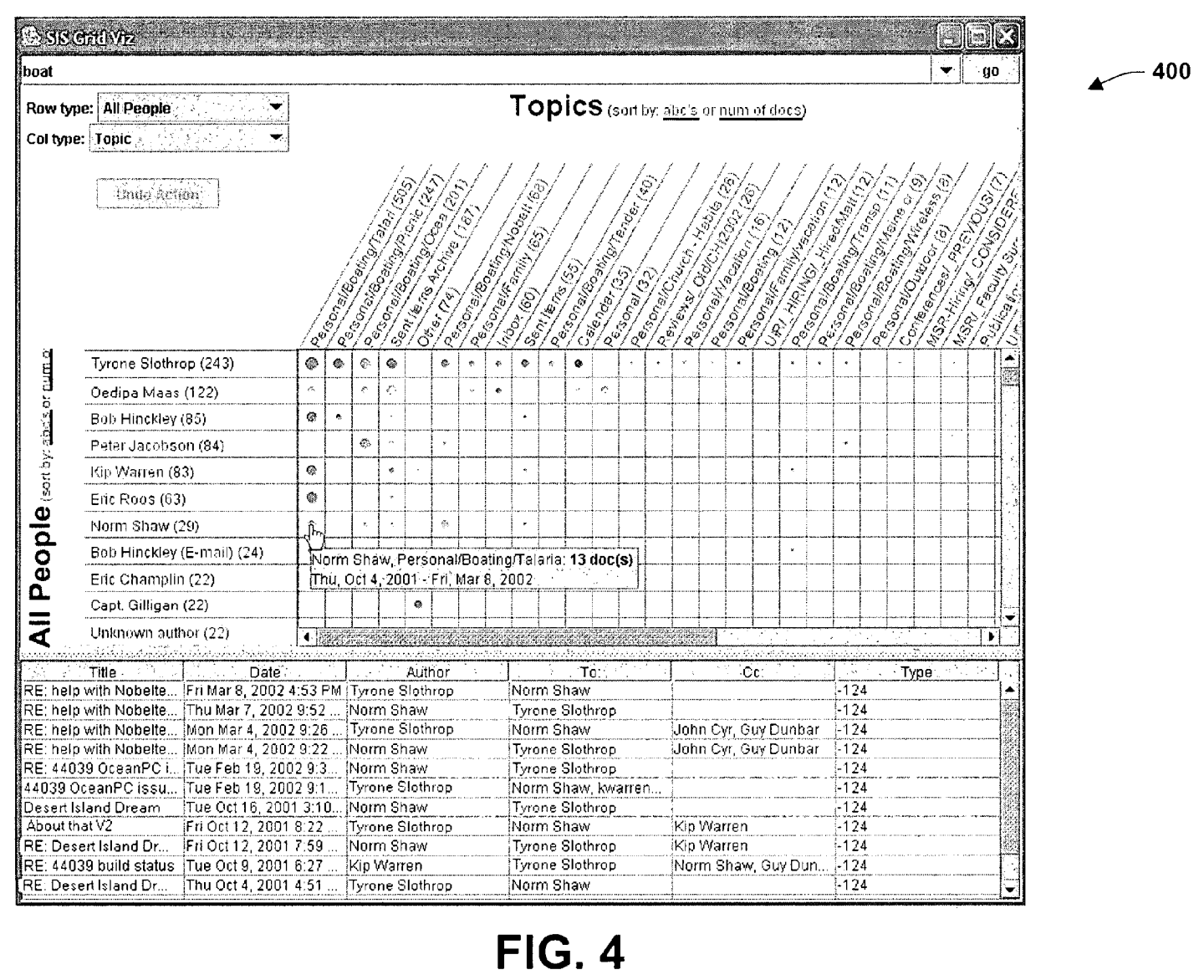

FIG. 4 illustrates an example grid visualization in accordance with an aspect of the present invention. In this aspect, the subject invention provides users with an interface that abstracts beyond individual search results. The summary displays enable users to explore trends, correlations, and other relationship in results from personal (and perhaps public) content. Such information sets could arise as the result of a search, or as a standing profile monitoring for changes of interest.

The following examples more concretely illustrate some exemplary types of tasks that are supported. In one example, a colleague recently needed to send email to everyone involved with a newly formed research initiative. A visualization that showed which people were associated with the topic of interest. In another example, a group manager wants to touch base with everyone in her group on a regular basis, and thus she would benefit from a visualization that showed her when she last sent email to each person in her group. These two examples also illustrate two design aspects of grid visualization:

1. Use people, topics and time to visualize the collection.
2. Make the visualization highly flexible.

Grid visualization employs a grid motif to show relationships between people, topics, and time such as illustrated in FIG. 4. Users assign one of these attributes to the X axis and another attribute to the Y axis. Topics are assigned to the Y axis and people are assigned to the X axis by default. By virtue of the attributes assigned to the grid's axes, each cell in the grid represents two attribute values. Since email is such an important document type, the visualization also enables users to place people in the "to:" (or cc: or from:) line of emails on the grid axis as well. Using these subgroups enables users to begin to investigate social patterns present in the collection.

The interface depicted in FIG. 4 visualizes the document collection returned when the user queries an information retrieval system that has indexed documents the user has seen. When the user performs a query, the system and/or interface obtains the results from the query and processes the documents in order to obtain the necessary information to populate the grid. This also creates a list of the people, topics, and time periods that appear in the collection, determines the number of documents associated with each attribute value, and populates the grid.

On each axis in FIG. 4, attribute values are listed that were found in the document set for the attribute assigned to the axis. For example, in FIG. 4, people are assigned to the X axis; hence, the people in the results set are listed on the X axis. In parentheses beside each value is the total number of documents that share that value.

Initially, attribute values are ordered on an axis based on the number of documents that share the value; values that have the most associated documents are listed first. The default orderings can be changed by user interaction. For example, selecting a row sorts the columns by their value on that row; selecting a column sorts the rows by their value on that column. Rows and columns can also be sorted alphabetically instead of by frequency.

Documents returned from a query are placed in grid cells based on their attribute values. Documents are often placed in more than one grid cell; for instance, an email message often has multiple people associated with it. A circle in a grid cell indicates that there are documents associated with that cell. The size of the circle corresponds to the number of documents in the cell. The circle's saturation is based on the timestamp of the most recent document in the cells. Hence, faded circles indicate that the cell does not contain any recent documents, and bright red circles denote the presence of recent documents.

The circles in the cells can be interactive. When the user mouses over a circle, flyover text appears which indicates the attribute values associated with the cell, the number of documents in the cell, and the earliest and latest timestamp of the documents. If the user clicks on a circle, additional details about the cell's documents are displayed, as shown in the lower portion of FIG. 4.

Figure 5:
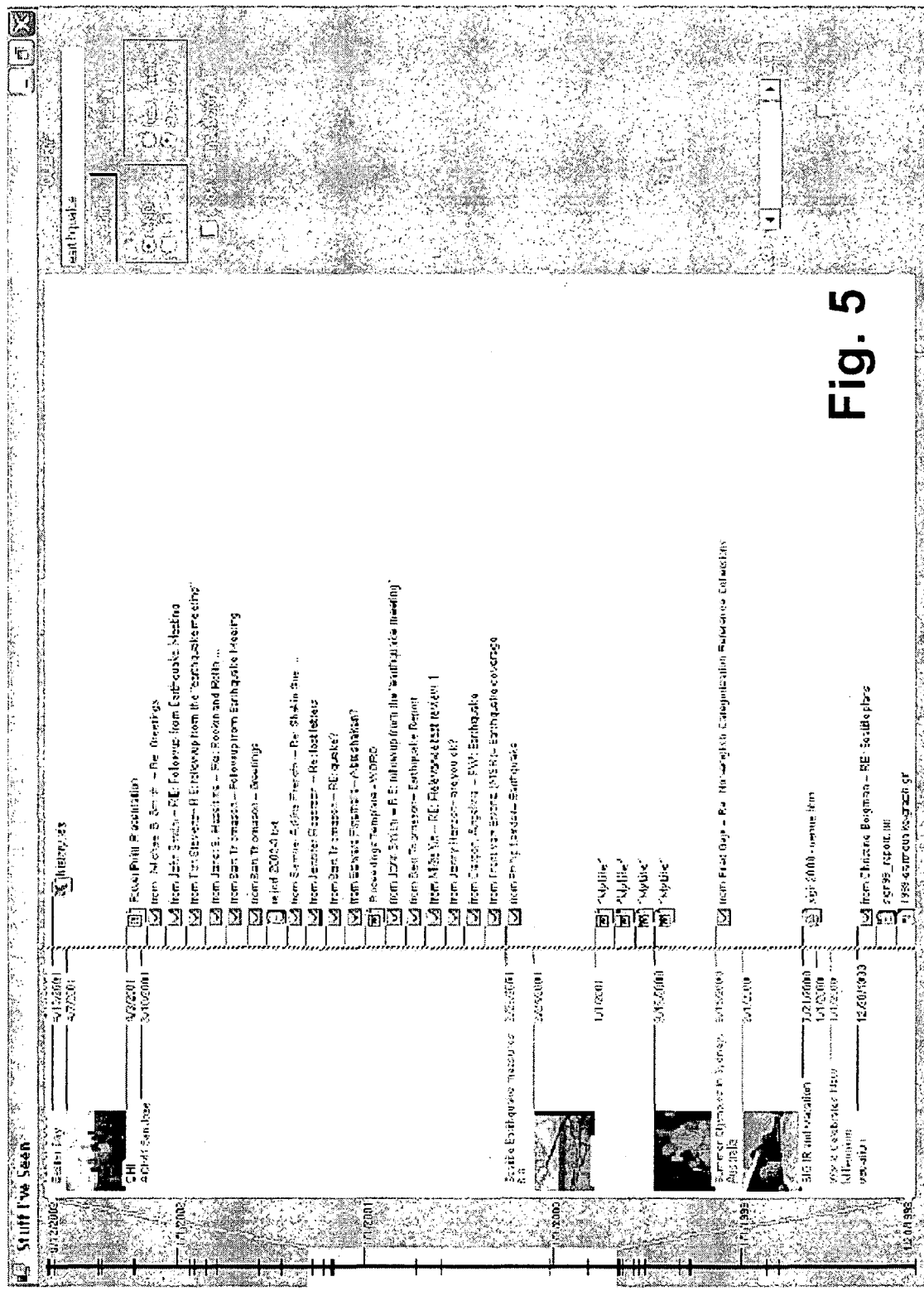
FIG. 5 illustrates an example timeline visualization in accordance with an aspect of the present invention.

FIG. 5 is an exemplary screenshot representation of a timeline visualization with temporal landmarks in accordance with the subject invention. The visualization has two main components that provide overview and detail about the search results. An overview area at the left shows a timeline with hash marks representing distribution of search results over time, and whose endpoints are labeled as the dates of the first and last search result returned. A highlighted region of the overview timeline corresponds to a segment of time displayed in a detailed view. To the left of the detailed timeline backbone, basic dates as well as landmarks drawn from news headlines, holidays, calendar appointments, and digital photographs provide context. To the right of the backbone, details of individual search results (represented by icons and titles) are presented chronologically.

The overview provides users with a general impression of the number of search results and associated distribution over time. A portion of the overview is highlighted; this corresponds to the section that is currently in focus in the detailed area of the visualization. Users can interact with the overview timeline as if it were a scroll bar, by selecting the highlighted region (e.g., with a mouse cursor) and moving it to a different section of the timeline, thus changing the portion of time that is displayed in the detailed view. The detailed portion of the visualization shows a zoomed in section of the timeline, corresponding to the slice of time highlighted in the overview area. Each search result is shown at the time when the document was most recently saved. An icon indicating the type of document (html, email, word processor, etc.) is displayed, as well as the title of the document (or subject line and author, in the case of email). By hovering the cursor over a particular search result, users can view a popup summary containing more detailed information about the object, including the full path, a preview of the first 512 characters of the document (or other amount), as well as to-, from-, and cc-information in the case of mail messages.

Clicking on a result opens the target item with the appropriate application. Search results are displayed to the right of the backbone of the detailed timeline. The left-hand side of the backbone is used to present date and landmark information. Dates appear nearest the backbone. The granularity of dates viewed (hours, days, months, or years) depends upon the current level of zoom. Four types of landmarks may be displayed to the left of the dates: holidays, news headlines, calendar appointments, and digital photographs (can include more or less types). Each of the landmarks appears in a different color (can be similar colors). It is to be appreciated that the scale, ordering and placement of the aforementioned aspects can be suitably tailored in accordance respective needs.

Public landmarks are drawn from incidents that a broad base of users would typically be aware of. Landmarks are given a priority ranking, and typically only landmarks that meet a threshold priority are displayed. For a prototype in accordance with the subject invention, all users saw the same public landmarks, although it is to be appreciated that different aspects of the invention can explore letting users customize their public landmarks adding, for instance, religious holidays that are important to them, or lowering the ranking of news headlines that they don't deem memorable.

A list of secular holidays commonly celebrated in the United States was obtained, and the dates those holidays occurred from 1994 through 2004, by extracting that information from a calendar. Priorities were manually assigned to each holiday, based on knowledge of American culture (e.g., Groundhog Day was given a low priority, while Thanksgiving Day was given a high priority). Holidays and priorities could easily be adapted for any culture.

News headlines from 1994–2001 (or other dates) were extracted from the world history timeline that comes with a commercially available multimedia encyclopedia program. Because 2002 events were not available, inventors of the subject invention used their own recollections of current events to supply major news headlines from that year. Ten employees from an organization (none of whom were participants in a later user study) rated a set of news headlines on a scale of 1 to 10 based on how memorable they found those events. The averages of these scores were used to assign priorities to the news landmarks.

Personal landmarks are unique for each user. For the prototype, all of these landmarks were automatically generated, but for other aspects of the subject invention it is appreciated that users can have the option of specifying their own landmarks.

Dates, times, and titles of appointments stored in the user's calendar were automatically extracted for use as landmark events. Appointments were assigned a priority according to a set of heuristics. If an appointment was recurring, its priority was lowered, because it seemed less likely to stand out as memorable. An appointment's priority increased proportionally with the duration of the event, as longer events (for example such as conferences or vacations) seemed likely to be particularly memorable. For similar reasons, appointments designated as "out of office" times received a boost in score. Being flagged as a "tentative" appointment lowered priority, while being explicitly tagged as "important" increased priority.

The above noted prototype crawled the users' digital photographs (if they had any). The first photo taken on a given day was selected as a landmark for that day, and a thumbnail (64 pixels along the longer side) was created. Photos that were the first in a given year were given higher priorities than those that were the first in a month, which in turn were ranked more highly than those which were first on a day. Thus, as the zoom level changed an appropriate number of photo landmarks could be shown.

Figure 6:
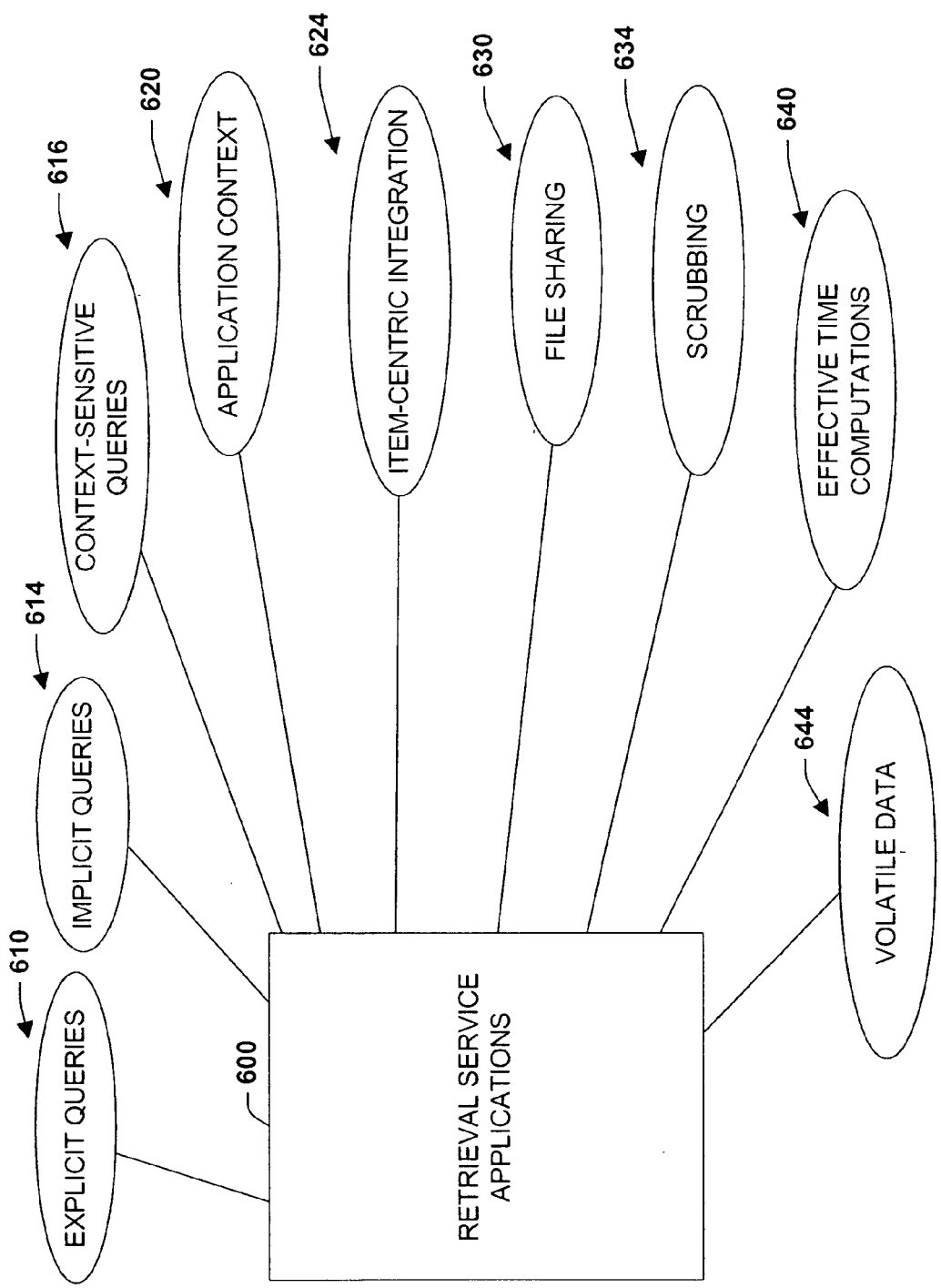
FIG. 6 illustrates retrieval service applications in accordance with an aspect of the present invention.

FIG. 6 illustrates various retrieval service applications 600 in accordance with an aspect of the present invention. As noted above, the present invention supports explicit queries 610 and/or implicit queries 614. Explicit queries 610 are directed by the user to find information of interest (e.g., show all data references relating to a meeting or date). Implicit queries 614 can in some cases be derived from the explicit query 610. For example, a user could have their desktop phone messages linked to their e-mail system or other message system. If a phone call were to arrive from selected individuals, the e-mail system could automatically retrieve e-mail relating to the individual via implicit query 614. In another example, at a predetermined interval before an upcoming meeting, the user's calendar system could trigger queries to recall data from past meetings or information relating to individuals attending the upcoming meeting. Also, implicit queries 614 may be generated based upon reasoning processes associated with the user's current context or query (e.g., a query composed of important words in recently read paragraphs).

Proceeding to 616, other types of queries support context-sensitive queries. These types of queries include providing additional selection options to edit or refine searches. For example, queries may be directed to a particular type of application or location (e.g., apply this query to mail folder only). At 620, the context of an application can be considered when performing a query. For example, if a photo application is being used, then the query can be refined to only search for images. At 624, item-centric integrations can be performed. This includes operating system actions that support interface actions such as mouse click functions, tagging items, updating metadata files, deleting items, editing items or content, and so forth.

At 630, file sharing can be performed in accordance with the present invention. For example, the user may specify that one or more other users can inspect or have access to all or a subset of their query/index database (e.g., all users on my project team are permitted access to my project notes). At 634, index scrubbing can occur. Over time, users may desire to remove one or more items from their index. In accordance with this activity, users can specify specific items to remove or specify general topic areas that can be automatically scrubbed by the system (e.g., remove thumbnails related to my birthday two years ago). Other actions could occur based upon logical or reasoning processes such as if an item were accessed fewer than a certain number of times in a predetermined period, then the item could be automatically removed if desired.

At 640, effective time computations are considered. As an example, the date that's relevant or useful concerning a file (during data presentation to a user) is the date it was changed, the date for presenting mail is usually the date it was delivered (and thus approximately when the user saw it), and the useful date for an appointment is the date the appointment occurs. It is noted that all time information recorded and indexed and that useful date information is utilized for presentation of information. So, for appointments, the present invention indexes the time the mail was sent, the time it was updated (if that happened), the time the user accepted/declines, and the time the meeting occurred, for example. However, typically one time is selected for display although more than one time can be provided.

As noted above, certain data can be marked as having been previously observed by analyzing file elements associated with a file type. For example, a text document may contain a field indicating when a file was open or last edited. With respect to calendar appointments however, merely creating an index from when the calendar was created is likely to be of minor benefit to people because sometimes meetings are created well in advance of the actual meeting date. Thus, when indexing a calendar appointment, the present invention tracks the actual meeting data as opposed to time of creation. This type of effective time consideration enables users to retrieve information in a manner more suited to memory recall. At 644, the volatility of data is considered and processed. This type of processing involves indexing of data into a persistent form during intermittent operations. As can be appreciated, various automated background operations are possible.

Figure 7:
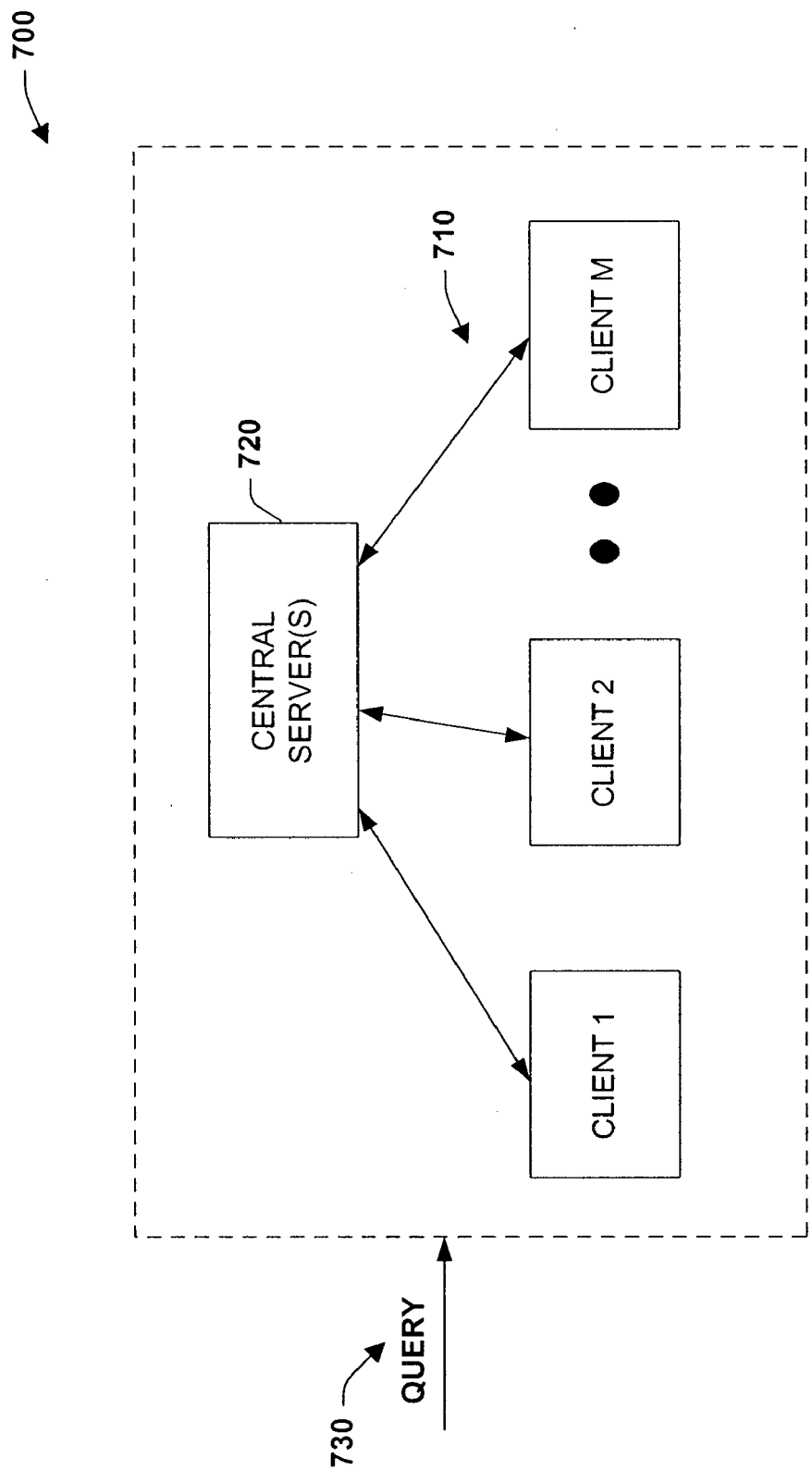
FIG. 7 is a system diagram illustrating a multiple machine execution environment in accordance with an aspect of the present invention.

FIG. 7 is a system 700 illustrating a multiple machine execution environment in accordance with an aspect of the present invention. In this aspect, functions providing indexing, storing, monitoring and querying of observed information can be achieved in a local process environment such as on one or more client machines 710. In another aspect, a centralized server 720 may provide one or more of the above functions. As can be appreciated various combinations of client server functionality can be provided. For example, in one aspect local indexing can occur on the client machines 710, wherein periodic dumps of indexed content are delivered to the server or servers 720. A query 730 is then directed to the server 720 for a comprehensive lookup of past data events collected from the client machines 710. In another aspect, the client machines 710 may receive the query 730, perform a local retrieval, and/or pass the query to the server 720 for other items of interest.

In yet another aspect, a majority of indexing and filtering occurs on the server 720, wherein activity data is collected from the client machines 710 to build a master index at the server. In another aspect, the server 720 may be responsible for building index content and during periodic intervals, dump all or portions of the index down to the client machines 710 to facilitate high speed access of content. When determining how to distribute functionality across machines, it is noted that tradeoffs may occur between indexing time versus distributed processing time (e.g., localized queries may be faster but centralized queries provide access to larger databases).

Figure 8:
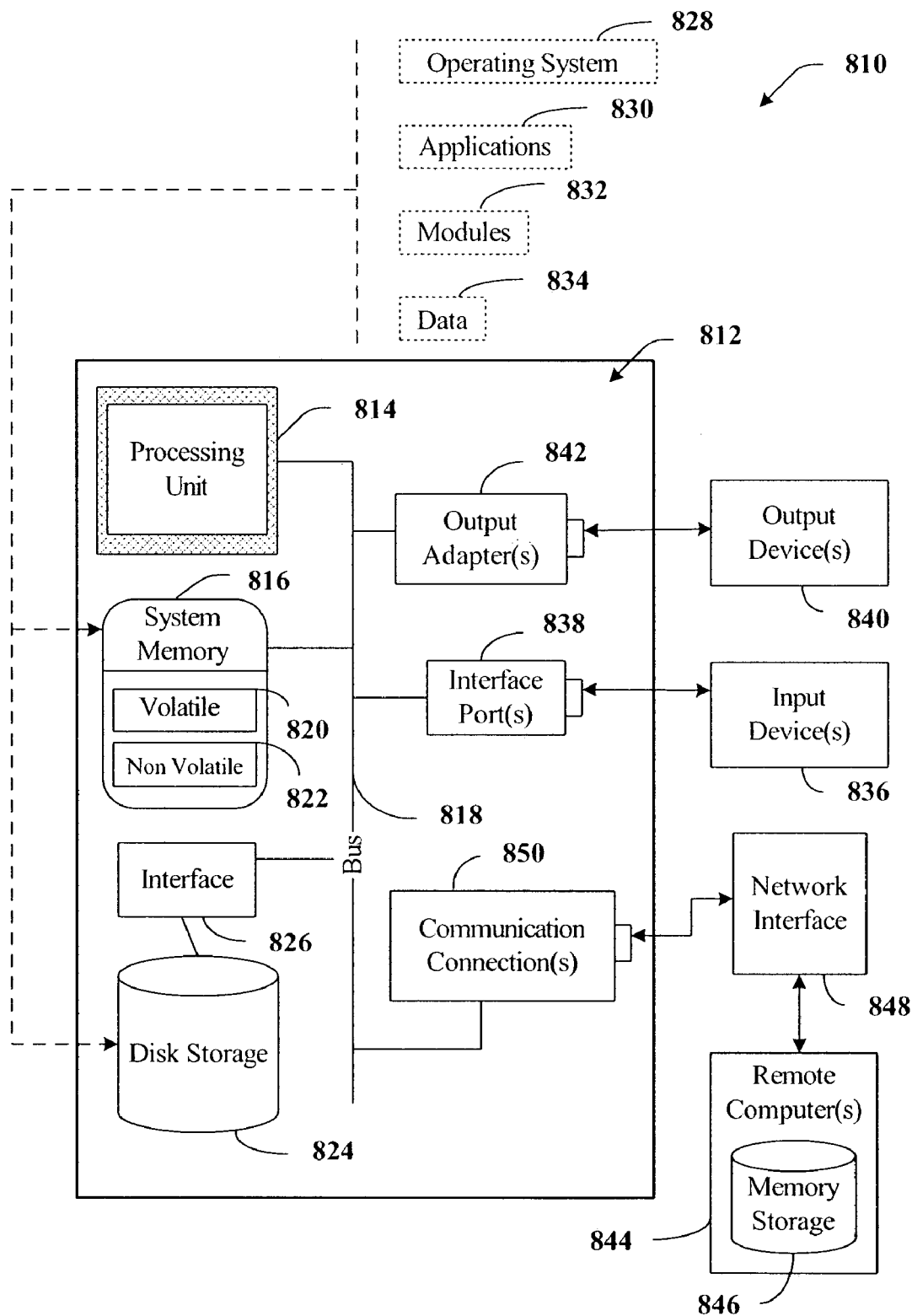
FIG. 8 is a schematic block diagram illustrating a suitable operating environment in accordance with an aspect of the present invention.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840, that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

Figure 9:
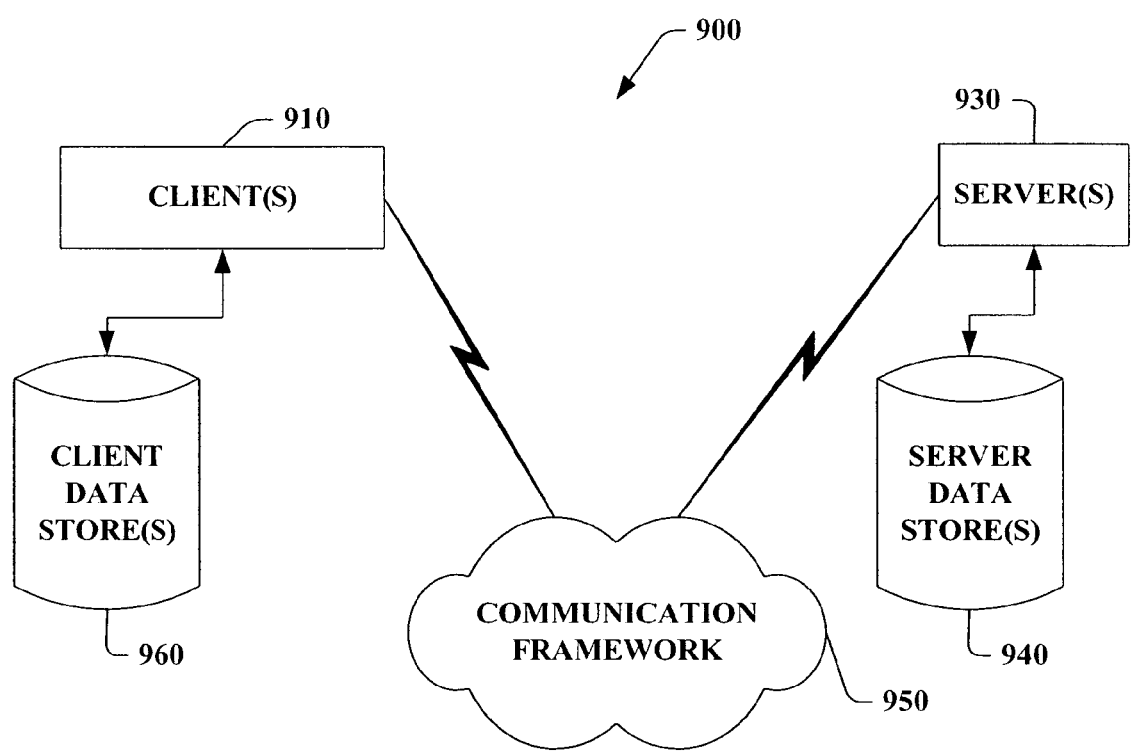
FIG. 9 is a schematic block diagram of a sample-computing environment with which the present invention can interact.

FIG. 9 is a schematic block diagram of a sample-computing environment 900 with which the present invention can interact. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the present invention, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operably connected to one or more client data store(s) 960 that can be employed to store information local to the client(s) 910. Similarly, the server(s) 930 are operably connected to one or more server data store(s) 940 that can be employed to store information local to the servers 930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates concurrent searching across a plurality of sources, comprising:
   a usage analyzer that determines user accessed items and a content analyzer that stores subsets of data corresponding to the items and sparse representations of the subsets, at least two of the items being associated with disparate sources, respectively, the disparate sources comprise local or remote data locations including files, folders, applications, images, audio files, appointments, email, and web information;
   an indexing component that indexes the data subsets and associates metadata with the accessed items, the metadata employed to retrieve the accessed items, and wherein the metadata includes at least one of a file path, a hyperlink, and a tag;
   a filter that extracts portions of the accessed items and creates sparse representations of accessed data in a content index;
   a search component that in response to a search query, initiates a search across the indexed data and outputs search results in the form of data, wherein the data includes documents, files, folders, applications, images, email, web information and links to locations of a subset and sparse representation of the subset;
   an implicit query that is derived from the search query; and
   a component to process implicit queries based upon potential interest to a user.

2. The system of claim 1, further comprising a gatherer component that specifies an interface to different content sources in their native format.

3. The system of claim 1, the filter decodes individual file formats and emits a character stream for further processing.

4. The system of claim 3, further comprising a tokenizer component that breaks the character stream into words and provides linguistic processing.

5. The system of claim 4, the linguistic processing includes at least one of date normalization and stemming.

6. The system of claim 1, further comprising a retriever component supporting a query language for accessing stored information.

7. The system of claim 6, the retriever component provides Boolean functions and best match retrieval on full text and metadata properties that enable at least one of phrase, wildcard and proximity searches.

8. The system of claim 1, further comprising a protocol handler to extract individual messages from exchange mail stores, local mail files, and public folders.

9. The system of claim 8, further comprising a component index attachments to email, which generalizes to other container objects.

10. The system of claim 1, further comprising an event component that monitors user and makes determinations with respect to user actions.

11. The system of claim 10, the event component includes to determine user actions or goals.

12. The system of claim 11, the event component employs evidential patterns of user activity including at least one of: a Focus of attention, an Introspection, an Undesired piece of information, and a Domain-specific syntactic and semantic content.

13. The system of claim 1, the implicit queries automatically invoke related information actions directed to a user, the information actions associated with a query at hand or a current context.

14. The system of claim 13, further comprising at least one of context-sensitive queries, application-context queries, and item-centric integrations.

15. The system of claim 1, further comprising a component that enables users to share selected electronic files with other users.

16. The system of claim 1, further comprising a component to remove accessed information items.

17. The system of claim 1, the search component employs effective time computations when presenting calendar items.

18. The system of claim 1, further comprising a component to perform background storage operations to processes volatile data.

19. The system of claim 1, at least one of the usage analyzer and the indexer is executed on at least one of a client machine and a server machine, the client and server machines including at least one computer respectively.

20. A computer readable medium having computer readable instructions stored thereon for implementing at least one of the usage analyzer and the indexer of claim 1.

21. A method that facilitates concurrent searching across a plurality of sources, comprising:
automatically monitoring a user and automatically analyzing a data source to determine whether the user has contemplated the data source;
automatically determining whether the user has contemplated the data source selected from at least two disparate data sources;
automatically storing subsets of data corresponding to the data source and sparse representations of the subsets;
automatically indexing the contemplated data source in a computerized index and associating metadata with the contemplated data source, the metadata employed to retrieve the contemplated data sources, and wherein the metadata includes at least one of a file path, a hyperlink, and a tag;
automatically filtering the contemplated data source and creating sparse representations of the contemplated data source;
automatically initiating a search across the indexed data in response to a search query;
automatically outputting search results in the form of data, wherein the data includes documents, files, folders, applications, images, email, web information and links to locations of a subset and sparse representation of the subset;
automatically deriving an implicit query from the search query; and
automatically processing implicit queries based upon potential interest to a user.

22. The method of claim 21, further comprising providing at least one of explicit query options and implicit query options to access the computerized index.

23. The method of claim 21, further comprising automatically updating a metadata file associated with the data source with at least one of explicit tag information and implicit tag information.

24. The method of claim 21, further comprising providing at least one of a file sharing option, a file scrubbing option, an effective time computation, and a background storage option.

25. The method of claim 21, further comprising displaying at least one of a timeline visualization and a grid visualization to represent queries derived from the computerized index.

26. A system that facilitates concurrent searching across a plurality of sources comprising:
means for determining when a user has accessed an information item;
means for filtering the information item;
means for storing subsets of data corresponding to the information item and sparse representations of the subsets, at least two of the items being associated with disparate sources, such as local and remote data sources;
means for indexing the subsets of data and sparse representations of the subsets in a content index and associating metadata with the information item, the metadata employed to retrieve the information item, and wherein the metadata includes at least one of a file path, a hyperlink, and a tag;
means for querying the content index;
means for initiating a search across the indexed data in response to the query;
means for outputting search results in the form of data, wherein the data includes documents, files, folders, applications, images, email, web information and links to locations of a subset and sparse representation of the subset;
means for deriving an implicit query from the search query; and
means for processing implicit queries based upon potential interest to a user.

* * * * *